Patented Jan. 16, 1923.

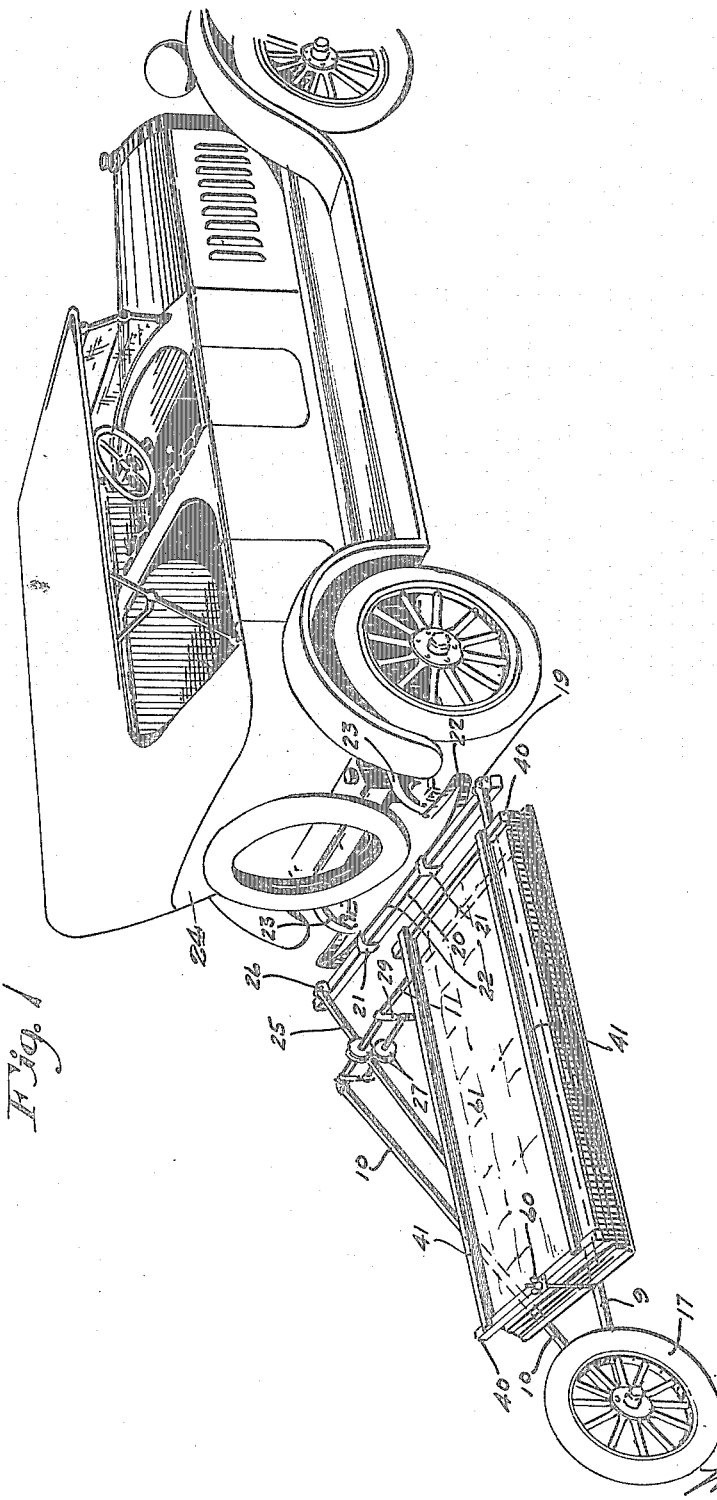

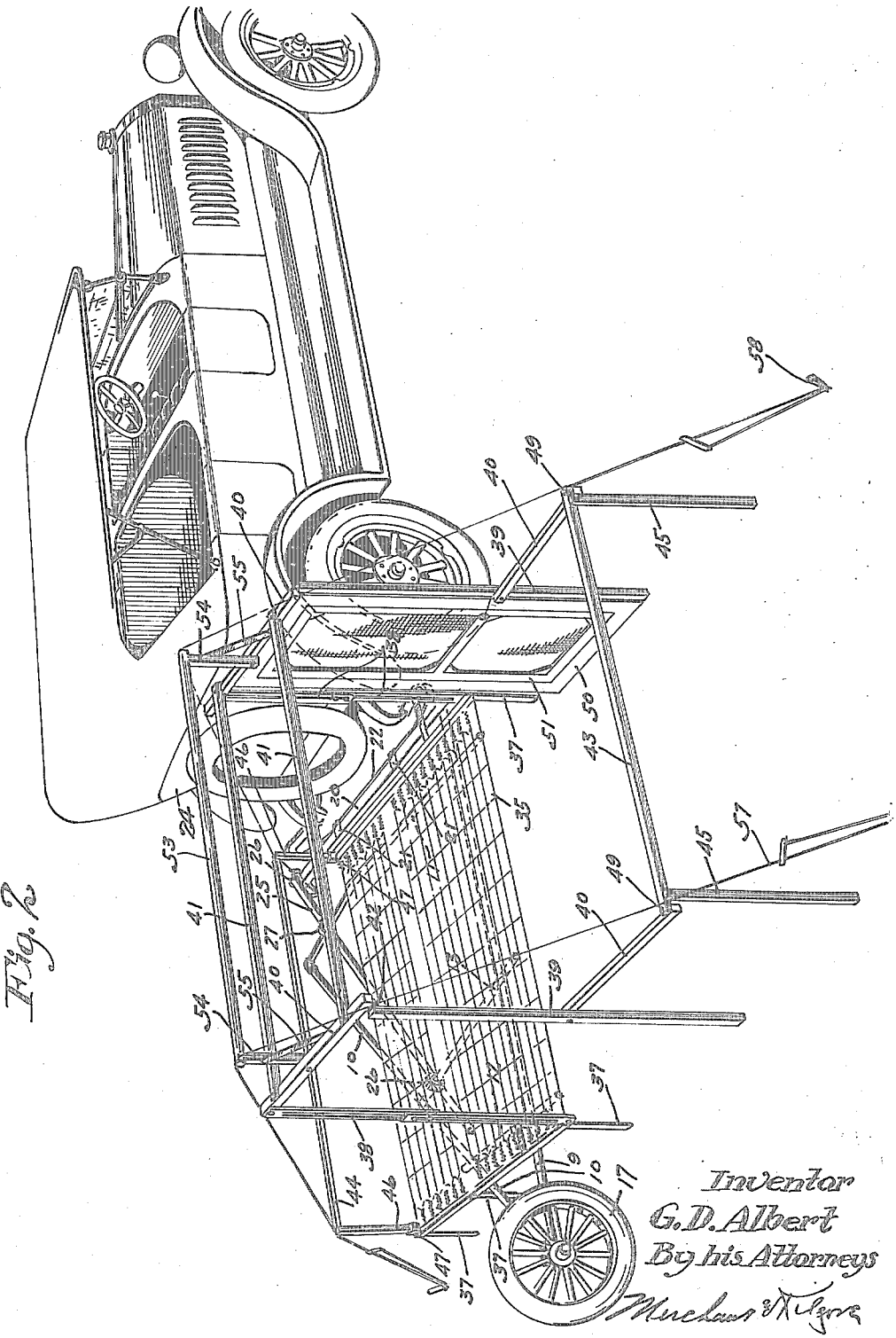

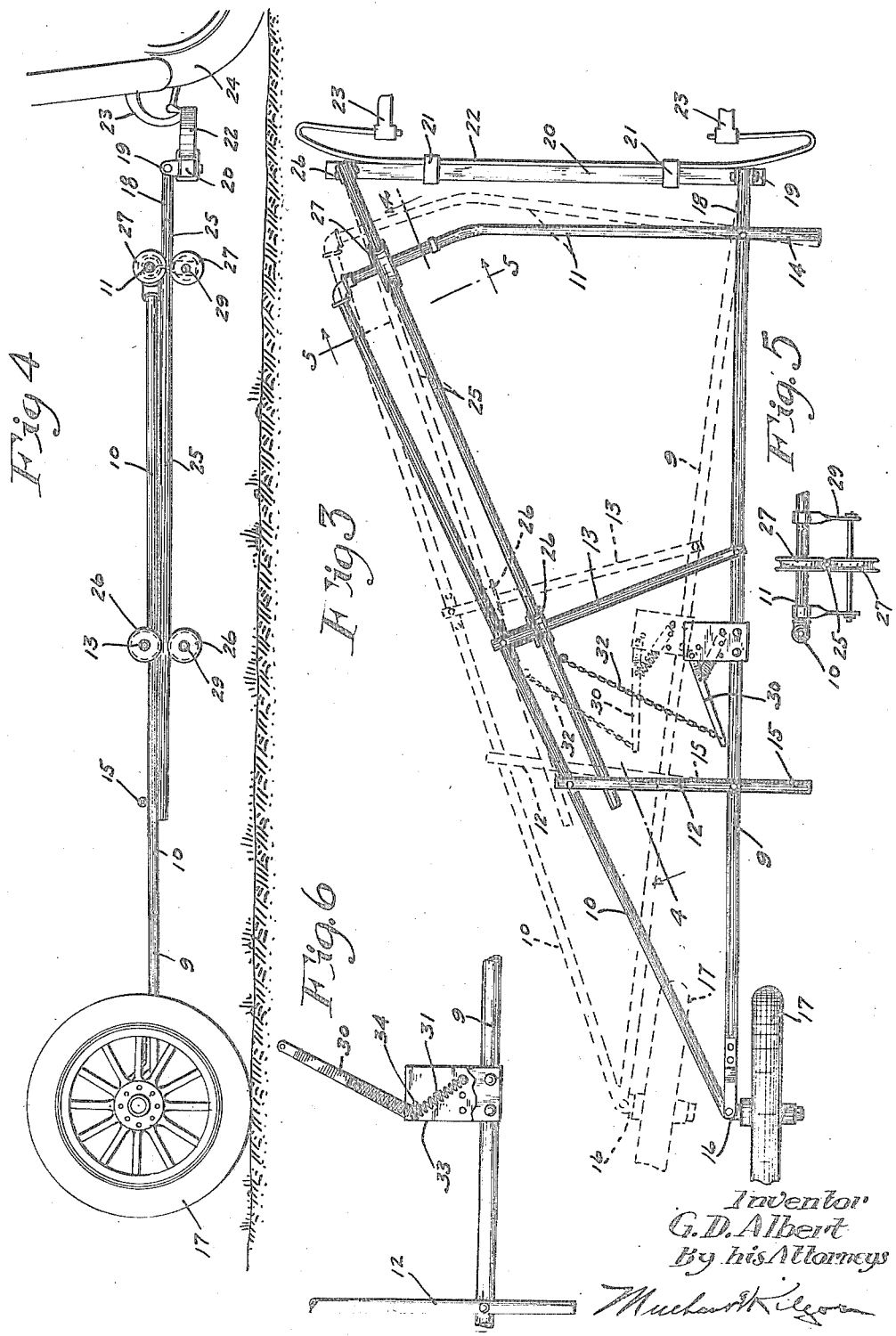

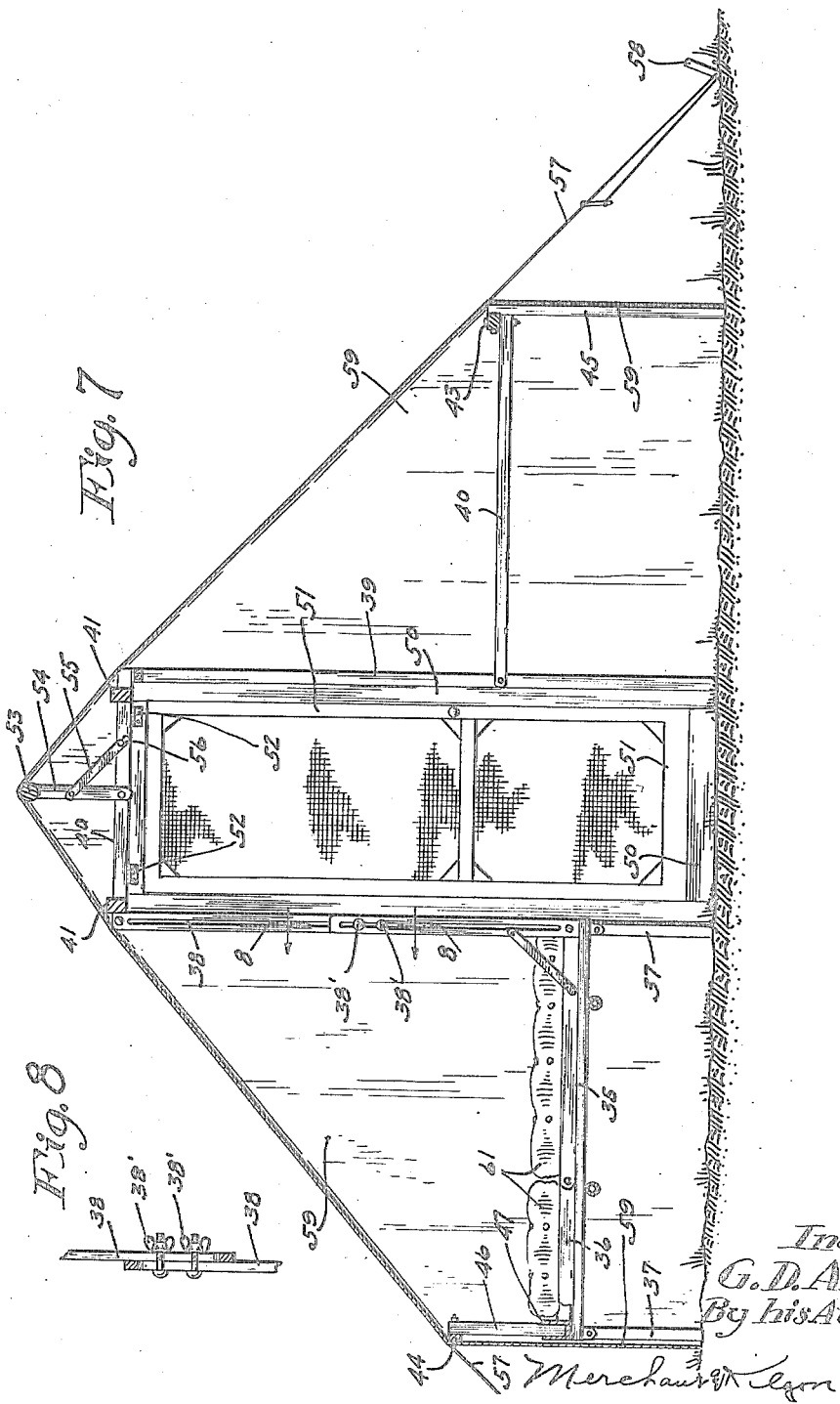

1,442,035

UNITED STATES PATENT OFFICE.

GEORGE D. ALBERT, OF MINNEAPOLIS, MINNESOTA.

VEHICLE TRAILER.

Application filed September 8, 1921. Serial No. 499,161.

*To all whom it may concern:*

Be it known that I, GEORGE D. ALBERT, a citizen of the United States, residing at Minneapolis, in the county of Hennepin and State of Minnesota, have invented certain new and useful Improvements in Vehicle Trailers; and I do hereby declare the following to be a full, clear, and exact description of the invention, such as will enable others skilled in the art to which it appertains to make and use the same.

My invention relates to vehicle trailers and, more particularly, to camp trailers having a knock-down or folding tent and other camp necessities, and has for its object to improve the same in the several particulars hereinafter noted.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of an automobile having the improved trailer attached thereto with the tent and other parts carried thereby folded;

Fig. 2 is a view corresponding to Fig. 1, with the exception that the tent frame is set up ready for the canvas;

Fig. 3 is a plan view of the trailer with the tent and bed springs removed and with some parts shown in different positions by means of broken lines;

Fig. 4 is a view partly in right-side elevation and partly in longitudinal vertical section taken on the line 4—4 of Fig. 3;

Fig. 5 is a detail view with some parts sectioned on the line 5—5 of Fig. 3;

Fig. 6 is a fragmentary plan view of the frame with the lever of the lateral pulling device shown in a different position than that shown in Fig. 2;

Fig. 7 is a transverse vertical section showing the tent set up; and

Fig. 8 is a detail view in section taken on the line 8—8 of Fig. 7.

Referring first in detail to the trailer, the same includes a frame comprising a straight side bar 9, an oblique side bar 10, rigidly and directly connected at their rear ends and rigidly connected at their front ends by a front end bar 11 in right-angled triangular arrangement. The two side bars 9 and 10 are further rigidly connected by a rear tie-bar 12 and an intermediate tie-bar 13. By reference to Fig. 3, it will be noted that the ends of the tie-bars 11 and 12, at the side bar 9, are extended outward thereof to afford extensions 14 and 15, respectively. The front tie-bar 11 is intermediately bent so that its ends extend at right angles to the side bars to which they are attached. It will also be noted that the tie-bars 12 and 13 extend at right angles to the side bars 9 and 10, respectively. On the rear end of the frame is rigidly secured a stub axle 16, which extends outward of the side bar 9 at right angles thereto and has journaled thereon a pneumatic tire-equipped wheel 17.

The front end of the side bar 9 is extended forward of the tie-bar 11 to afford an extension 18 which is connected by a universal coupling 19 to a horizontal bar 20 connected by clips 21 to a rear bumper 22 attached to the rear springs 23 of an automobile 24. It is important to note that the coupling 19 is substantially aligned with the wheels on the right side of the automobile 24 and that the line of pull on the frame is such as to cause the wheel 17 to follow in the track of the wheels on the right side of said automobile.

The front end of the frame, at the other or left-hand side of the automobile, is supported on a track rail 25, one end of which is connected to the left-hand end of the bar 20 by a universal coupling 26. The track rail 25, when the automobile is traveling straight ahead, extends rearward, substantially parallel to the oblique side bar 10 and the frame is supported at its left-hand side, for movement on said track rail, by pairs of front and rear grooved wheels 27 and 28, respectively, arranged to run on said track rail, as best shown in Fig. 4. The upper wheels 27–28 are journaled on the front tie-bar 11 and intermediate tie-bar 13, respectively, and the lower wheels 27–28 are journaled on hanger brackets 29 attached to the tie-bars 11–13. It is important to note that the front pair of wheels 27 is free for axial movement to permit lateral angular movement of the track rail 25 during the turning movement of the trailer on the coupling 19, in respect to the automobile.

The shape of the trailer frame and the mounting thereof is such as to bring the center of gravity slightly to the left of the side bar 9 and, in actual road tests, it has been found that the tendency of the wheel 17 is to travel laterally to the right, slightly out of the track of the right-hand wheels of an automobile. Hence, after the automobile has made a turn to the left, the wheel 17, after passing out of the turn made by the automobile, will again align itself with the right-hand wheels of the automobile.

To overcome the tendency of the wheel 17 to travel laterally to the right of the track of the right-hand wheels of the automobile and to align itself with the said wheels, after passing out of a turn made by the automobile to the right, I provide a lateral pulling device, which, as shown, includes a lever 30, a coiled spring 31 and a flexible connection or cable 32. The lever 30 is bifurcated and the prongs thereof are fulcrumed to and between a pair of plates 33 rigidly secured to the side bar 9 between the tie-bars 12 and 13. The free end of the lever 30 is connected by the cable 32 to the track rail 25. The spring 31 is intermediately secured to the lever 30 and anchored to and between the plates 33.

When the automobile is traveling straight ahead, the spring 31 holds the free end of the lever 30 against the side bar 9 as a stop, and at this time, the cable 32 is taut. When the automobile turns to the left, the trailer frame will move forward on the track rail 25 and thereby put slack in the cable 32. If the automobile turns to the right, the trailer frame will move rearward on the track rail 25, and thereby, through the cable connection 32, draw the lever 30 away from the side bar 9 against the tension of the spring 31. After the wheel 17 has passed out of the curve made by the automobile in turning to the right, the spring 31 will again draw the lever 30 toward the side bar 9 and thereby cause the wheel 17 to travel laterally to the left and again align itself with the wheels on the right side of the automobile.

If a turn made by the automobile to the right is sufficiently sharp to cause the cable 32 to move the lever 30 into alignment therewith, said cable and lever will act as a positive stop to prevent further angular movement or turning movement of the trailer, in respect to the automobile. In the extreme position of the lever 30, as shown in Fig. 6, the same is beyond a dead center, and to cause the spring 31 to bring the same back to normal position, said spring is caused to bend around a pin 34, the ends of which are secured to the plates 33. The turning movement of the trailer, in respect to the automobile, to the left, is limited by the engagement of the wheels 27 with the bar 20. Other means, of course, may be provided for limiting this movement of the trailer.

For the sake of lightness, the frame of the trailer and the track rail 25 are preferably made from pipes or tubing. While the front of the trailer is shown attached and supported from the bumper on the rear end of an automobile, it is, of course, understood that said trailer may be supported and attached to an automobile in various different ways.

The bed or load-carrying body for the trailer, as shown, is in the form of a main bed spring 35 supported on the side bars 9 and 10 and tie-bars 11 and 12 and rigidly secured thereto by clips or other fastening devices, not shown. This main bed spring 35, which carries the load, is so positioned on the trailer frame that the center of gravity is to the left of the side bar 9. Hinged to the left-hand edge of the main bed spring 35 is a bed spring section 36 arranged to be folded thereon. At the four outer corners of the bed springs 35 and 36 and rear joint therebetween, are folding legs 37 arranged, when turned down, to support the bed springs and trailer so that the automobile may be detached from the trailer.

The tent frame includes, at each end, two intermediate uprights 38 and 39 laterally spaced and connected at their upper ends by an end bar 40. The uprights 38 are longitudinally extensible and contractable and the sections thereof are held in different adjustments by pairs of nut-equipped bolts 38' which extend through longitudinal slots in said sections. At their lower ends, the uprights 38 are supported on the right-hand front and rear corners of the bed spring 35 and are pivoted thereto for folding movement in parallel arrangement with the ends thereof.

The upper ends of the uprights 38 are pivoted to the end bars 40, which permits said end bars to be folded in substantially parallel arrangement therewith onto the bed spring section 35. The end bars 40 are rigidly connected near their ends by cross-bars 41, and the uprights 39, which rest directly on the ground, have their upper ends hinged at 42 to the right-hand ends of the end bars 40 for folding movement into parallel arrangement with the cross-bars 41.

The tent frame shown is designed for a wall tent and the top thereof, at the two side walls, is supported on cross-bars 43 and 44, the former of which has, at its ends, pivoted ground-engaging legs 45 arranged to be folded into parallel arrangement therewith. The cross-bar 44 has, at its ends, pivoted legs 46 removably supported in sockets 47 on the two left-hand corners of the bed spring section 36, and which legs are adapted to be folded into parallel arrangement with the cross-bar 44. Horizontal end bars 48, at one of their ends, are pivoted to the uprights 39 for folding movement into parallel arrangement therewith and, at their other ends, are connected to the cross-bar 43 by pivots 49. These pivots 49, when the end bars 48 are folded, are aligned with the hinges 42 and thereby permit the cross-bar 43 to be folded into parallel arrangement with the uprights 39 when they are folded into parallel arrangement with the cross-bars 41.

A door frame 50, in which is hinged a screen door 51, is mounted between the uprights 38 and 39 at the front of the trailer and hinged at 52 to the respective end bar 40 for folding movement under the cross-bars 41. As the openings between the uprights 38 and 39 are entirely at the right of the trailer, the door 51 is free to swing at one side of the automobile.

Intermediately of the cross-bars 41 is a ridge-pole 53 having at its ends short depending arms 54 pivoted to the end bars 40 for folding movement in parallel arrangement therewith and therebetween.

Brace bars 55, pivoted to the arms 54 and releasably secured to headed studs on the end bars 40, hold said arms in upright position. Ropes 57, attached to the ends of the ridge-pole 53 are secured by stakes 58 driven into the ground on opposite sides of the tent and firmly hold the tent frame set up. The canvas or tent proper, which is supported by the folding tent frame, is indicated as an entirety by the numeral 59.

When the tent frame and bed spring section 36 are folded as above described, the same lie in compact form on the bed spring 35, as shown in Fig. 1. One or more nut-equipped bolts 60 may be provided for holding the tent frame folded, as shown in Fig. 1. Mattress sections 61, shown in Fig. 7, are placed on the bed springs 35 and 36 and, in actual construction, the joints between the bed springs will preferably be such that the mattress section on the bed spring section 36 may be folded onto the other mattress section with the bed spring section 36.

While the wheel of the trailer is shown arranged to run in the right-hand track of the vehicle, it is, of course, understood that the same may be arranged to run in the left-hand track or the vehicle may simply be turned either side up to cause its wheel to run in either track of the vehicle.

What I claim is:

1. A vehicle trailer comprising a frame, a coupling for attaching the front of the frame to the rear of a tractor with freedom for horizontal oscillatory movement, a single wheel supporting the rear of the frame and arranged to follow in the track of the wheels on one side of the vehicle, and yielding means under strain to hold said wheel against lateral traveling movement in one direction.

2. A vehicle trailer comprising a frame, a coupling for attaching the front of the frame to the rear of the vehicle at one side thereof, a single wheel supporting the rear end of the frame and arranged to track with the wheels on the side of the vehicle to which the frame is attached, and means supporting the other side of the frame from the vehicle with freedom for angular movements with respect to the vehicle.

3. A vehicle trailer comprising a frame, a coupling for attaching the front of the frame to the rear of a vehicle at one side thereof, a wheel supporting the rear of the frame and arranged to track with the wheels on the side of the vehicle to which the frame is attached, the center of gravity of the frame being between the line of pull from the coupling to the wheel and the track on the other side of the vehicle, and mechanical means tending to hold the wheel against lateral traveling movement away from the center of gravity.

4. A vehicle trailer comprising a frame, a coupling for attaching the front of the frame to the rear of a vehicle at one side thereof, a wheel supporting the rear of the frame, and arranged to track with the wheels on the side of the vehicle to which the frame is attached, the center of gravity of the frame being between the line of pull from the coupling to the wheel and the track on the other side of the vehicle, and yielding means tending to hold the wheel against lateral traveling movement away from the center of gravity.

5. A vehicle trailer comprising a frame, a coupling for attaching the front of the frame at one side to one side of a vehicle with freedom for horizontal oscillatory movement, a track rail attached to the other side of the vehicle with freedom for horizontal oscillatory movement and supporting the respective side of the frame with freedom for movement thereon toward and from the vehicle, and a wheel supporting the rear of the frame.

6. A vehicle trailer comprising a frame, a coupling for attaching the front of the frame at one side to one side of the vehicle with freedom for horizontal oscillatory movement, a track rail attached to the other side of the vehicle with freedom for horizontal oscillatory movement and supporting the respective side of the frame with freedom for movement thereon toward and from the vehicle, a wheel supporting the rear of the frame, and means connecting the frame to a part carried by the vehicle to yieldingly hold said wheel against lateral traveling movement in one direction from a predetermined line of travel.

7. A vehicle trailer comprising a frame, a coupling for attaching the front of the frame at one side to one side of a vehicle with freedom for horizontal oscillatory movement, a track rail attached to the other side of the vehicle with freedom for horizontal oscillatory movement and supporting the respective side of the frame with freedom for movement thereon toward and from the vehicle, a wheel supporting the rear of the frame, and arranged to follow in the track of the wheels on the side of the vehicle to which the frame is attached, and means connecting the frame to a part carried by the vehicle to yieldingly hold said wheel against lateral traveling movement in one direction from a predetermined line of travel.

8. A vehicle trailer comprising a frame, a coupling for attaching the front of a frame at one side to one side of a vehicle with freedom for horizontal oscillatory movement, a track rail attached to the other side of a vehicle with freedom for horizontal oscillatory movement, front and rear pairs of upper and lower wheels journaled on the frame and arranged to run on the track rail for supporting the respective side of the frame, and a wheel supporting the rear of the frame.

9. A vehicle trailer comprising a frame, a coupling for attaching the front of a frame at one side to one side of a vehicle with freedom for horizontal oscillatory movement, a track rail attached to the other side of a vehicle with freedom for horizontal oscillatory movement, front and rear pairs of upper and lower wheels journaled on the frame and arranged to run on the track rail for supporting the respective side of the frame, one pair of said wheels being free for axial movement on the frame, and a wheel supporting the rear of the frame.

10. A vehicle trailer comprising a frame, a coupling for attaching the front of a frame at one side to one side of a vehicle with freedom for horizontal oscillatory movement, a track rail attached to the other side of a vehicle with freedom for horizontal oscillatory movement and supporting the respective side of the frame with movement thereon toward and from the vehicle, a wheel supporting the rear of the frame and arranged to travel in the track of the wheels on the side of the vehicle to which said coupling is attached, and means including a spring lever and a flexible connection for connecting the frame to a part carried by the vehicle for holding the wheels against lateral movement in one direction out of said track.

11. A vehicle trailer comprising a frame, a coupling for attaching the front of a frame at one side to one side of a vehicle with freedom for horizontal oscillatory movement, a track rail attached to the other side of a vehicle with freedom for horizontal oscillatory movement and supporting the respective side of the frame with movement thereon toward and from the vehicle, a wheel supporting the rear of the frame and arranged to travel in the track of the wheels on the side of the vehicle to which said coupling is attached, and means including a spring lever and a flexible connection for connecting the frame to a part carried by the vehicle for holding the wheels against lateral movement in one direction out of said track and positively limiting the turning movement of the trailer in respect to the vehicle in one direction.

12. A vehicle trailer having a skeleton frame comprising a pair of side bars connected at their rear ends and a front end bar connecting their front ends in right-angle triangular arrangement, a wheel journaled to the rear end of the frame, a coupling at the front end of the frame at its straight side for attaching the same to a vehicle at one side thereof, a track rail on which the frame is movably mounted at its front and oblique side, and a coupling for attaching the track rail to the other side of the vehicle, said two couplings being arranged to permit horizontal oscillatory movement of the frame and track rail in respect to the vehicle.

13. A vehicle trailer having a skeleton frame comprising a pair of side bars connected at their rear ends and a front end bar connecting their front ends in right-angle triangular arrangement, a wheel journaled to the rear end of the frame, a coupling at the front end of the frame at its straight side for attaching the same to a vehicle at one side thereof, a track rail on which the frame is movably mounted at its front and oblique side, a coupling for attaching the track rail to the other side of the vehicle, said two couplings being arranged to permit horizontal oscillatory movement of the frame and track rail in respect to the vehicle, and a rear tie-bar connecting the frame side bars, said front and rear tie-bars being extended outward of the straight side of the frame.

14. A vehicle trailer having a skeleton frame comprising a pair of side bars connected at their rear ends and a front end bar connecting their front ends in right-angle triangular arrangement, a wheel journaled to the rear end of the frame, a coupling at the front end of the frame at its straight side for attaching the same to a vehicle at one side thereof, a track rail on which the frame is movably mounted at its front and oblique side, a coupling for attaching the track rail to the other side of the vehicle, said two couplings being arranged to permit horizontal oscillatory movement of the frame and track rail in respect to the vehicle, a rear tie-bar connecting the frame side bars, said front and rear tie-bars being extended outward of the straight side of the frame, and a load-carrying body located over the front and rear side bars and on either side of the straight side bar.

15. A vehicle trailer comprising a frame, a coupling for attaching the front of the frame to the rear of a vehicle at one side thereof, a wheel supporting the rear of the frame and arranged to track with the wheels on the side of the vehicle to which the frame is attached, a load-carrying body on the frame, the center of gravity of the frame and load-carrying body being between the line of pull from the coupling to the wheel and the track on the other side of the vehicle, and folding ground-engaging legs for the load-carrying body.

16. A vehicle trailer comprising a frame, a coupling for attaching the front of the frame to the rear of a tractor at one side thereof with freedom for horizontal oscillatory movement, and a single wheel supporting the rear of the frame and arranged to track with the wheel on the side of the vehicle to which the frame is attached, said trailer being reversible to cause its wheel to track with the wheels on either side of the vehicle.

In testimony whereof I affix my signature.

GEORGE D. ALBERT.